Patented Feb. 6, 1951

2,540,545

UNITED STATES PATENT OFFICE 2,540,545

METHOD OF IMPROVING THE SOLUBILITY OF LOWMETHOXYL PECTIN IN LIQUIDS CONTAINING POLYVALENT METAL IONS, AND PECTIN PRODUCT SUITABLE FOR MAKING JELLIES WITH SUCH LIQUIDS

Karl Pedersen, Copenhagen, Denmark, assignor to Kobenhavens Pektinfabrik v. Karl Pedersen, Copenhagen, Denmark No Drawing. Application December 9, 1949, Serial No. 132,206. In Sweden December 10, 1948

9 Claims. (Cl. 99—132)

As is well known, it is often impossible or at least very difficult to dissolve the so-called lowmethoxyl pectin in liquids containing calcium ions or other polyvalent metal ions such as magnesium ions, with the result that jelly making with such liquids is not possible or very difficult without taking special precautions. If, for example, a lowmethoxyl pectin, having an acid weight equivalent below about 320, is added to milk, which contains calcium ions, and then the milk is subjected to heating, the pectin fails to go into solution, even after boiling the milk for a long period of time. The said disadvantage is especially annoying, because lowmethoxyl pectin otherwise has the great advantage compared with usual pectin of being capable of forming jellies in the presence of smaller proportions of sugar than the usual pectin.

The term "lowmethoxyl pectin" is, as will be known, generally used to indicate a partly deesterified pectin having a comparatively high content of free acid groups as compared with usual pectin. The term "pectinic acid" is sometimes used. Some or all of the free acid groups in the pectin molecule may be neutralized so as to form salts, and the term "lowmethoxyl pectin" as used in the following specification and the appended claims also comprises such salts.

The degree of deesterification of the lowmethoxyl pectin may vary considerably. In common practice lowmethoxyl pectins, in which at least 50%, say up to 80% or more, of the ester groups are deesterified, are the preferred. As a measure for the degree of deesterification may be used the "acid weight equivalent" by which is understood the quantity of pectin in grammes containing one gramme-equivalent acid-hydrogen as determined by titrating with a strong base until alkaline.

As examples of liquids, in which lowmethoxyl pectin may be insoluble or difficultly soluble, may be mentioned milk, including skimmed milk, concentrated milk, cream and other liquid milk products, hard waters and the like liquids used in jelly making, including liquids by which the contents of polyvalent metal ions such as calcium or magnesium ions is due to the addition of ingredients containing such ions.

It is an object of the present invention to provide a process improving the solubility of lowmethoxyl pectin in such liquids of the above mentioned nature, in which it is insoluble or difficultly soluble.

Another object of the invention is to provide a process by which not only the solubility of lowmethoxyl pectin is improved, but by which also variations in the proportion of the pectin product required to form a definite jelly resulting from variations in the weight equivalent of the pectin from batch to batch during the pectin manufacture, may be counteracted.

It is a further object of the invention to provide a pectin product ready for use in making jellies with liquids of the said nature.

Other objects will appear from the following specification.

According to the invention the solubility of lowmethoxyl pectin in liquids containing calcium ions or other polyvalent metal ions is improved by adding to the pectin or to the liquid, in which the pectin is to be dissolved, at least one alkali pyrophosphate.

It has been shown that by such addition the lowmethoxyl pectin is very easily brought into solution, either with or without heating, in liquids of said nature, e. g. milk. The proportion of pyrophosphate used to obtain the desired result may vary widely depending on various factors such as the "acid weight equivalent" of the pectin, the concentration of the polyvalent metal ions in the liquid, the pH-value of the liquid, the desired setting temperature, etc. Generally, it may be said that proportions of, for example, between about 50% and 100% by weight of pyrophosphate (including crystal water, if present), of the proportion of lowmethoxyl pectin will normally be satisfactory to produce the desired result, but a satisfactory result may also in most cases be obtained by using proportions exceeding these limits, for example, down to as little as about 15% or up to about 120%. In case of the preparation of edible jellies the pyrophosphate used should, naturally, be non-poisonous for the organism, but in the final jelly prepared by means of the pectin the proportion of the pyrophosphate will normally be unimportant.

The setting temperature, i. e. the temperature at which the liquid containing the pectin in solution sets to a jelly by cooling, is decreased by the presence of the pyrophosphate. By varying the proportions of added pyrophosphate it is possible to a considerable extent to vary the setting temperature. If it be desired, for example, as it is often the case in households, that the jelly sets comparatively quick, i. e. that the setting temperature shall be comparatively high, a smaller proportion of pyrophosphate is added than when a comparatively low setting temperature is desired.

Of the alkali pyrophosphates sodium pyrophosphate is the preferred, because it is not hygroscopic to a substantial degree, which is of importance in case of mixtures of pectin and pyrophosphate, which are to be stored for a shorter or longer period. Preferably the neutral pyrophosphates are used, but also the acid pyrophosphates may be used. According to the invention a mixture of a neutral and acid pyrophosphate is conveniently used, thereby adjusting the ratio between the neutral and acid pyrophosphate in accordance with variations in the weight equivalent of the pectin, to maintain the proportion of the pectin product required to form a definite jelly at an approximately constant value. The weight equivalent of the pectin will, as said above, usually vary from batch to batch during the pectin manufacture, which normally will result in variations in the proportion of pectin powder required for preparing a definite jelly. This is, naturally, disadvantageous for the user of the pectin product. This disadvantage can now be remedied by adjusting the said ratio, so that the user of the pectin product can always prepare a definite jelly by using the same proportion of a pectin product, no matter whether the weight equivalent of the pectin departs from that normally desired. If, for example, the weight equivalent of the pectin is higher than that desired for the preparation of a definite jelly by using a definite proportion of powder, this disadvantage can be remedied by increasing the proportion of acid pyrophosphate at the expense of the proportion of neutral pyrophosphate. The reverse is the case when the weight equivalent is lower than desired.

Although, to obtain an improved solubility of the lowmethoxyl pectin in liquids of the above mentioned nature, the alkali pyrophosphate can be added directly to the liquid without mixing it in advance with the pectin, it is desirable for the jelly maker to avoid this procedure and to have available a pectin product containing the pyrophosphate and capable of being used in jelly making without further ceremony by adding it to the liquid. The invention comprises such mixtures of lowmethoxyl pectin and alkali pyrophosphate, and also such mixtures containing further additional ingredients such as starch, colouring matter, flavouring matter or like ingredients commonly used in jelly making.

The invention is further illustrated in the following examples of pectin preparations.

Examples 1. 3 g. pectin: weight equivalent 288
   3 g. neutral sodium pyrophosphate ($Na_4P_2O_7$, $10H_2O$).

This mixture is suitable for the preparation of jelly with 1 liter of milk. The setting temperature of the milk jelly is about 32° C.

2. 3 g. pectin: weight equivalent 288
   1.5 g. neutral sodium pyrophosphate ($Na_4P_2O_7$, $10H_2O$).

Using this mixture for making a milk jelly with 1 liter of milk, a jelly is obtained with a setting temperature of about 52° C.

3. 3 g. pectin: weight equivalent 288
   1 g. neutral sodium pyrophosphate ($Na_4P_2O_7$, $10H_2O$).

Using this mixture as in the preceding examples a setting temperature of about 70° C. is obtained.

4. 3 g. pectin: weight equivalent 288
   0.75 g. neutral sodium pyrophosphate ($Na_4P_2O_7$, $10H_2O$)
   0.75 g. acid sodium pyrophosphate ($Na_2H_2P_2O_7$, $6H_2O$).

Using this mixture as in the preceding examples the setting temperature is about 72° C.

5. 3 g. pectin: weight equivalent 280
   1.2 g. neutral sodium pyrophosphate ($Na_4P_2O_7$, $10H_2O$)
   0.3 g. acid sodium pyrophosphate ($Na_2H_2P_2O_7$, $6H_2O$).

Using this mixture as in the preceding examples the setting temperature is about 72° C.

6. 3 g. pectin: weight equivalent 270
   1.5 g. neutral sodium pyrophosphate ($Na_4P_2O_7$, $10H_2O$).

Using this mixture as in the preceding examples the setting temperature is about 72° C.

7. 3 g. pectin: weight equivalent 288
   1.5 g. neutral sodium pyrophosphate ($Na_4P_2O_7$, $10H_2O$)
   20 g. maize starch
   Colouring and flavoring matter.

Such mixture can be directly stirred into cold milk, after which the latter is heated to boiling, whereby the pectin will be completely dissolved.

Instead of mixing the pectin with the pyrophosphate before adding to the liquid as in the above examples, the pyrophosphate can be added as such to the liquid. In this latter procedure the potassium salts of pyrophosphate can be used just as well as the sodium salts, because the hygroscopicity is of no importance.

I claim:

1. A method of improving the solubility of lowmethoxyl pectin in such liquids containing polyvalent metal ions, in which it is normally difficultly soluble, comprising adding to the liquid at least one alkali pyrophosphate.

2. A method of improving the solubility of lowmethoxyl pectin in such liquids containing polyvalent metal ions, in which it is normally difficultly soluble, comprising mixing the pectin before dissolving with at least one alkali pyrophosphate.

3. A method of improving the solubility of lowmethoxyl pectin in milk, comprising adding at least one alkali pyrophosphate to the milk.

4. A method of improving the solubility of lowmethoxyl pectin in milk, comprising mixing the pectin before dissolving with at least one alkali pyrophosphate.

5. A method for the preparation of a lowmethoxyl pectin product soluble in such liquids containing a polyvalent ions, in which the lowmethoxyl pectin is normally difficultly soluble, comprising incorporating in the product a mixture of a neutral and acid alkali pyrophosphate, neutralizing variations in the proportion of pectin product required to form a definite jelly arising from variations in the weight equivalent of pectin, by varying the ratio between neutral and acid pyrophosphate.

6. A pectin product, comprising lowmethoxyl pectin in mixture with at least one alkali pyrophosphate.

7. A pectin product as claimed in claim 6, in which the alkali pyrophosphate is sodium pyrophosphate.

8. A pectin product, comprising lowmethoxyl pectin in mixture with a neutral and acid alkali pyrophosphate.

9. A pectin product, comprising lowmethoxyl pectin in mixture with at least one alkali pyrophosphate and additional ingredients as commonly used in jelly making.

KARL PEDERSEN.

REFERENCES CITED

The following references are of record in the file of this patent:

UNITED STATES PATENTS

| Number | Name | Date |
|---|---|---|
| 2,207,299 | Mnookin | July 9, 1940 |

OTHER REFERENCES

"Use of Polymetaphosphates and Polyphosphates in the Extraction of Pectin and Pectinic Acids from Citrus Peel," The Avi Publishing Co., New York. Published in Fruit Products Journal 27(2):36–39, Oct. 1947.